United States Patent
LaPenta et al.

(10) Patent No.: US 7,924,160 B1
(45) Date of Patent: Apr. 12, 2011

(54) REAL-TIME RANGING AND ANGLE MEASUREMENTS USING RADAR AND SURFACE ACOUSTIC WAVE TRANSPONDERS

(75) Inventors: Jason M. LaPenta, Waltham, MA (US); Joseph A. Paradiso, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 257 days.

(21) Appl. No.: 11/715,110

(22) Filed: Mar. 7, 2007

Related U.S. Application Data

(60) Provisional application No. 60/779,879, filed on Mar. 7, 2006.

(51) Int. Cl.
*G08B 13/14* (2006.01)
*G08B 1/08* (2006.01)
(52) U.S. Cl. ............. 340/572.4; 340/539.13; 310/313 B
(58) Field of Classification Search ................ 340/572.4, 340/539.13; 310/313 B
See application file for complete search history.

(56) References Cited

U.S. PATENT DOCUMENTS

| | | | | |
|---|---|---|---|---|
| 6,150,921 A | * | 11/2000 | Werb et al. | 340/10.1 |
| 6,611,224 B1 | * | 8/2003 | Nysen et al. | 342/42 |
| 6,894,616 B1 | * | 5/2005 | Forster | 340/572.1 |

* cited by examiner

*Primary Examiner* — Benjamin C Lee
*Assistant Examiner* — Cal Eustaquio
(74) *Attorney, Agent, or Firm* — Charles G. Call

(57) ABSTRACT

A system for tracking the position of multiple objects in three dimensional space by transmitting radar interrogation signals having predetermined wave shapes to surface acoustic wave transducers attached to each object. Each transducer includes a unique electrically conductive pattern on one surface of a piezoelectric substrate for selectively responding to the predetermined wave shape of one of the interrogation signals for inducing a surface acoustic wave in the substrate and for thereafter transforming the surface acoustic wave into an electromagnetic response signal having detectable properties that uniquely identify said transducer. The location of each transducer is estimated by measuring the time-of-flight or angle-of-arrival of the radar signals at several measurement stations and producing a position estimate by triangulation.

17 Claims, 7 Drawing Sheets

REAL-TIME RANGING AND ANGLE MEASUREMENTS USING RADAR AND SURFACE ACOUSTIC WAVE TRANSPONDERS

CROSS REFERENCE TO RELATED APPLICATIONS

This application is a non-provisional of, and claims the benefit of the filing date of, U.S. Provisional Patent Application Ser. No. 60/779,879 filed on Mar. 7, 2006, the disclosure of which is incorporated herein by reference.

FIELD OF THE INVENTION

This invention relates to methods and apparatus for determining the location of objects.

BACKGROUND OF THE INVENTION

Many applications need to detect the position and motion of multiple objects in three dimensional space. For example, methods for tracking the movement of different parts of the human body can be used in computer-aided design, training systems, virtual environments, medical diagnosis and therapy, computer game control, mobile platform coordination, and robotic control. Three dimensional tracking of animals may be used for behavioral and gait studies or wildlife tracking, and three dimensional tracking of the motion of physical objects may be used in security, inventory control, asset tracking and instrumentation systems.

In the past, human body motion has been recorded using vision instrumented rooms, inertial measurement units (IMU), active magnetic trackers, or ultrasonic sensors. All of these prior techniques have shortcomings. Vision-based tracking systems require a carefully controlled environment to ensure line-of-sight visibility of visual markers that are often obtrusive and must contrast with background objects. Ultrasonic transponders are bulky, require a power source, and have limited line-of-sight constraints and their performance is greatly compromised by typical environmental interference. Inertial measurement units are bulky, costly, require a power source, and are limited by bandwidth and accuracy. Other techniques are based on active RF systems, such as Ultra Wide Band (UWB) and spread-spectrum time-of-flight, or received signal strength (RSSI) measurements. These techniques require a potentially bulky transponder that need an on-board battery. There thus remains a need for improved methods and apparatus that can provide unobtrusive, low-cost tracking at high data rates.

Radar has long been used to track a multitude of targets such as aircraft, weather balloons, and cars, and employs many different modes of operation, such as Doppler, angle-of-arrival, and time-of-flight measurement. Transponders located on the targets respond to interrogation signals by returning data containing an encoded signature that uniquely identifies each target being tracked. Transponders are carried by almost all airplanes to provide air traffic control systems with aircraft identification data. See, for example, "Radar Signal Processing," by Robert J. Purdy et al., Lincoln Laboratory Journal, Vol. 12, No. 2 (2000).

Radio Frequency Identification (RFID) tracking systems have also been developed in which active or passive tags are attached to objects to be identified or tracked. Active RFID tags carry their own power source, typically a battery, and can operate at longer ranges than passive tags which draw their power from a field that emitted from a nearby wireless radiation source. U.S. Pat. No. 6,353,406 issued to Lanzi et al. on Mar. 5, 2002 describes a dual mode tracking system that employs both active and passive transponders, calculates the distance of a tagged object from each of several interrogating antennas by measuring round trip signal time, and then calculates a position estimate for the tagged target by triangulation. Unfortunately the transponders used in the Lanzi et al. system employ complex solid-state electronic circuitry to respond to and process the incoming signal, to produce encoded response signals that uniquely identify each transponder, and to retransmit the encoded signals to the reading stations. The passive tags used in the Lanzi et al system, while they eliminate the need to carry an onboard battery, require circuitry for generating an operating potential to power the signal processing circuitry from wireless power source that must be close to the passive tags. The resulting passive and active tags are expensive to manufacture, tend to be bulky, exhibit slow response times which limit the system's ability to track rapidly moving objects in real time, have limited range and, in the case of passive tags, require a wireless power station to supply operating potentials to the on-board solid state signal processing circuitry.

SUMMARY OF THE INVENTION

In a principle aspect, the present invention takes the form of methods and apparatus for determining the location of one or more objects in three-dimensional space.

In the preferred embodiment of the invention, one or more transmitting stations periodically transmit electromagnetic interrogation signals to a surface acoustic wave (SAW) transponder attached to each object to be tracked. The SAW transponder includes an antenna for capturing electrical energy from the received electromagnetic interrogation signals. The antenna is connected to a conductive element attached to the surface of a piezoelectric substrate. The conductive element converts the electrical energy received by the antenna into a surface acoustic wave that propagates across the surface of the substrate where it is intercepted by a pattern of encoding elements on the substrate. In one tag implementation, the encoding elements reflect acoustic energy having a modified waveform back to the conductive element which converts the reflected acoustic energy into a delayed and modified electromagnetic response signal that is applied to and transmitted by the SAW device antenna.

By processing the reflected and encoded response signals from the transponder(s), a signal processing system determines the position of the transponder(s) in three-dimensional space by one of several possible methods, including:

(a) by measuring the distance separating each transponder from each of one or more receiving stations and concurrently measuring the angle-of-arrival (e.g. azimuth or elevation) of the response signals from the transponders, the processor calculates the position of each transponder based on the combination of the measured direction to the target transponder and its distance from the receiving station.

(b) by measuring the distance (range) separating each transponder from each one of a plurality of spaced-apart measurement stations and calculating a position estimate by triangulation, or (c) by measuring the angle-of-arrival of the signal received from each target transponder (i.e. measuring the direction to the target) from a plurality of spaced-apart measuring stations and calculating a position estimate by triangulation.

Two or more position estimates produced by any of the above-noted methods may be combined to produce a more accurate position estimate.

The surface acoustic wave transponders employed in the preferred embodiment of the invention selectively receive electromagnetic signals having defined characteristics and modify the wave shape of those signals so that the returned signals have identifiable and detectable attributes which uniquely identify the specific transponder being tracked.

In accordance with the invention, the SAW devices passively process the received signals and thereby encode the returned signals with unique identifying characteristics without the need for electronic processing or modulating circuitry, thereby minimizing the cost, complexity and size of the transponders. To augment the range of the transponders, the passive SAW device may be combined with a normally inactive amplifier that is activated briefly in response to receipt of an incoming electromagnetic signal from an interrogating transmitter to amplify the returned signal, and then returns to an inactive power conservation state. This will allow a small battery to provide power for boosting the return transmission with greatly extended life.

The resulting SAW device transponders can be very small (e.g. 10 mm×10 mm—an order of magnitude smaller than conventional tags used in prior art tracking systems) and hence can be used in large numbers to provide multiple tracking points when needed by applications such as tracking the complex motions of the human body. Moreover, the SAW transponders may be inexpensively manufactured (e.g. $1 or $2 each when made in volume quantities, permitting the use of large numbers of tags at a reasonable cost). Further, the fast response time of the SAW transponders permits them to be used at high tracking rates (e.g. 150 kHz). Still further, the SAW transponders can be accurately tracked in the presence of environmental interference and radar clutter.

The encoded signal which is returned by the SAW transponder has an encoded wave shape having unique, detectable characteristics that identify the particular transponder which produced the signal. The position of the identified transponder in three-dimensional space is determined by measuring either the time-of-flight of the signal, the angle-of-return of the signal, or both. Measurements taken at a plurality of receiver locations may used to form one or more position estimates by triangulation; that is, by determining the intersection of arcs having a measured radius from each receiver that measures the time-of-flight of returned signals or lines drawn in directions from the receivers based on angle-of-return measurements.

Preferred embodiments of the invention are characterized by the following attributes:

(a) objects may be accurately located in three dimensional space within a relatively short-range (0-100 m) of a measurement station in real time.

(b) a transponder attached to each tracked object employs a surface acoustic wave device to produce a return signal having a wave shape that uniquely identifies the particular transponder and does so without requiring electronic signal processing circuitry;

(c) each transponder is passively powered by the incoming interrogation signal and on-board electronics is limited to the optional use of a normally dormant signal transmitter that is activated briefly only when an incoming interrogation signal is received to amplify the magnitude of the encoded response signal returned by SAW transponder;

(d) Means may be employed for compensating for the effect that temperature changes would otherwise have on the wave shape of the signal produced by the SAW device;

(e) the transponders can be individually selected, relay transponder data, and encode the returned signal with an identification value; and (f) multiple measurement stations may be used to interrogate transponders and measure time-of-flight and/or angle-of-arrival in order to produce position estimates for the target objects.

These and other features and advantages of the invention may be better understood by considering the following detailed description of a preferred embodiment of the invention. In the detailed description that follows, reference will be made to the attached drawings.

DETAILED DESCRIPTION

Figure 1:
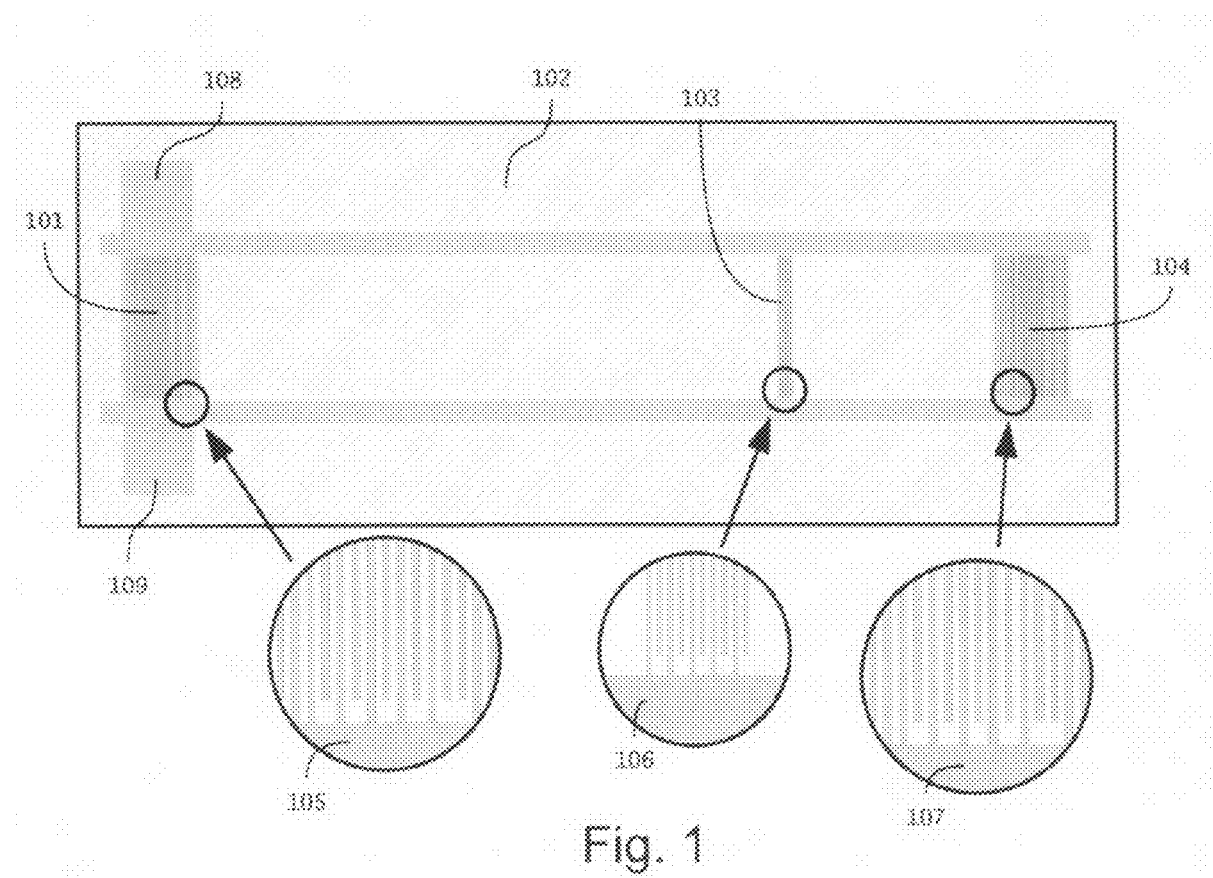
FIG. 1 is a simplified diagram of principle functional components of a SAW transponder used in a preferred embodiment of the invention.

Tracking the position and motion of objects is desirable in numerous applications that require or would benefit from methods and apparatus capable of tracking rapidly moving objects with high resolution and high data rates. The preferred embodiments of the invention fulfill this need by using small Surface Acoustic Wave (SAW) transponders, which are referred to here as "microtags," that are attached to movable objects and that are tracked by a distributed radar tracking network. The radar network tracks the location of the SAW transponders in three-dimensional space with an update rate, or number of samples per second, on the order of 10 kHz with an accuracy to within 10 cm$^3$ or better in an optimized implementation.

Surface Acoustic Wave devices were originally developed in the 1960's and are generally described by H. Matthews in "Surface Wave Filters: Design, Construction, and Use," New York: John Wiley & Sons, 1977, and by C. K. Campbell in "Surface Acoustic Wave Devices for Mobile and Wireless Communications," San Diego: Academic Press, 1998. SAW devices generate surface acoustic waves in a piezoelectric substrate. These waves propagate across the substrate surface and are intercepted by reflective elements which modify the wave shape of the surface waves in a way that is unique to the particular transponder. The modified acoustic wave shape is then reconverted into an electromagnetic signal which is retransmitted to a receiving device which detects the returned signal to identify and locate the SAW transponder. SAW devices are extensively used as narrow, band-pass filters in commercial communications equipment such as cellular telephones. As discussed below, the unique properties of SAW devices make them an excellent choice for the real-time tracking applications contemplated by the present invention.

Preferred implementations of the present invention employ two major components: the SAW transponder and the radar measurement station used together to accomplish 3-d tracking.

The SAW Transponder

A SAW transponder reflects a short pulse of received RF energy back to the measurement station as an encoded pattern of data. An arrangement of correlators and impedance modulated reflectors on the surface of the SAW transponder return properly encoded data patterns back to the antenna for retransmission to the measurement station. Detailed descriptions of specific SAW transducers that may be used to implement the invention can be found in the following papers:

(a) Robert Brocato, "Programmable SAW Development." Sandia Report SAND2004-5255, Albuquerque, N. Mex.: Sandia National Laboratories (October, 2004);

(b) Robert Brocato, "Passive Microwave Tags," Albuquerque, N. Mex.: Sandia Report SAND2004-4924, Sandia National Laboratories (October, 2004);

(c) Robert Brocato, "Passive Wireless Sensor Tags," Sandia Report SAND2006-1288, Sandia National Laboratories (March. 2006);

(d) L. Reindl, "Wireless passive SAW identification marks and sensors," in 2nd Int. Symp. Acoustic Wave Devices for Future Mobile Communication Systems, (Freiburg, Germany), Institute for Microsystem Technology, Albert-Ludwigs-University Freiburg (March 2004); and (e) Pohl, A. and Steindl, R. and Reindl, L., The "intelligent tire" utilizing passive SAW sensors measurement of tire friction." Instrumentation and Measurement, IEEE Transactions, volume 48, number 6, pgs. 1041-1046 (December 1999).

Other SAW transponders which can be used to implement the invention are described in U.S. Pat. No. 4,825,207 issued on Nov. 25, 1986 to H. Skeie; U.S. Pat. No. 4,725,841 issued n Feb. 16, 1988 to Nysen et al.; U.S. Application Publication No. 2004/0075361 filed by C Hartmann and published on Apr. 22, 2004; and in U.S. Application Publication No. 2005/009909 filed by C. Hartmann et al. and published on May 12, 2005. The temperature compensation technique described in U.S. Pat. No. 4,734,698 issued on Mar. 29, 1988 to Nysen et al. may be used to advantage. The disclosures of each of the foregoing patents are incorporated herein by reference.

Figure 2:
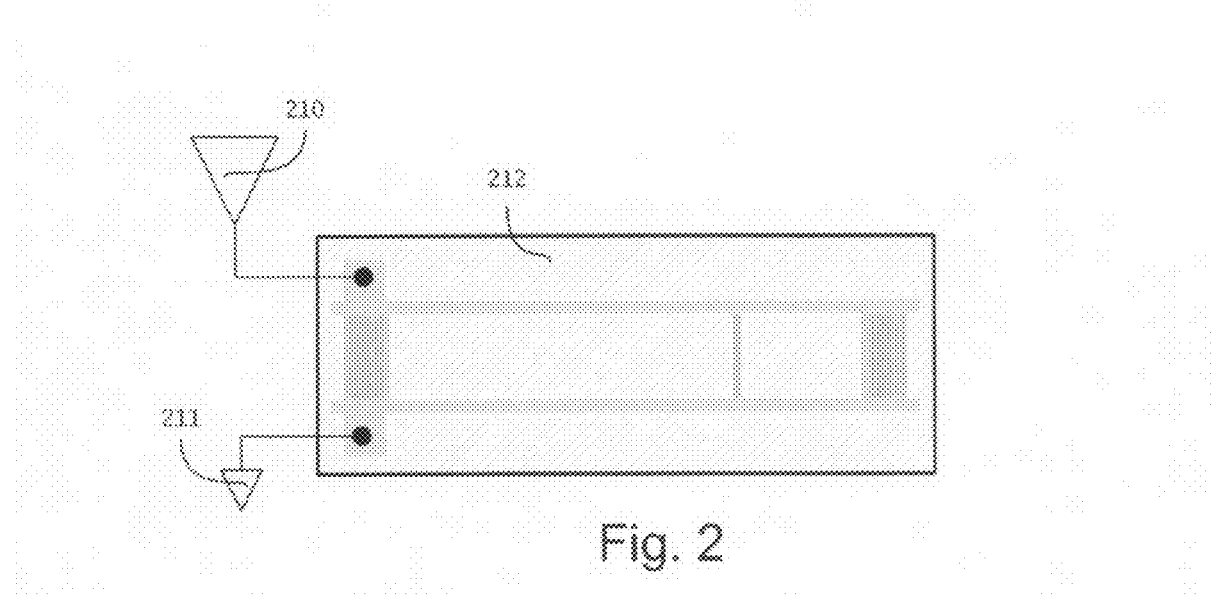
FIG. 2 is a diagram illustrating how a SAW transponder is connected to an antenna.

The SAW transponder consists of a piezoelectric substrate, seen at 102 in FIG. 1 and at 212 in FIG. 2, which is patterned with a thin layer of aluminum. The transponders are preferably passive, meaning they require no external source of power other than the incident RF energy. In the illustrative arrangement seen in FIG. 1, three inter-digital transducers (IDTs) are seen at 101, 103, and 104, seen in detail in the corresponding enlargements at 105, 106 and 107 respectively. Each IDT is a linear array of metal fingers which change incident electrical energy from the antenna into a surface acoustic wave on the piezoelectric substrate 102. This surface wave travels along at a slow velocity (in comparison to RF) until reflected by one of the metallic reflector strips, as described in the published papers noted above.

FIG. 2 shows the SAW transponders connection to an antenna. One bond-pad seen at 108 on the thin layer of aluminum patterned on the surface of the substrate 212 is connected to the active conductor of an antenna 210, while the other bond pad 109, is connected to the antenna's ground conductor 211.

A SAW transponder reflects a chirp waveform of received RF energy back to the measurement station as an encoded pattern of data. One of several published techniques may be used for selection, identification, and encoding of data with the tags, including the arrangements described in the above-noted papers by Brocato and Reindl. An arrangement of correlators and impedance modulated reflectors on the surface of the SAW transponder return properly encoded data patterns back to the antenna for retransmission to the measurement station.

Position Measurement

Figure 4:
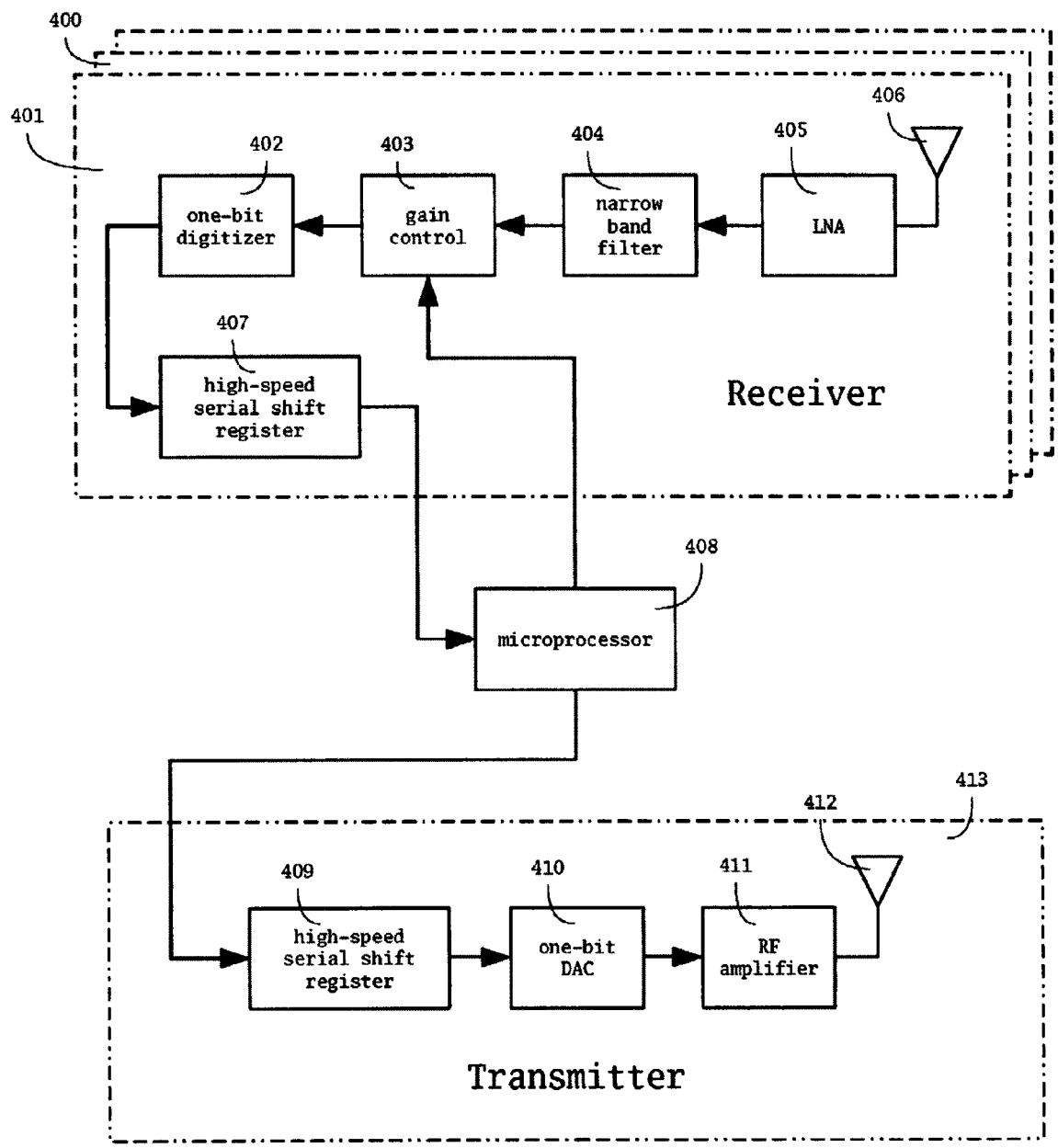
FIG. 4 is a block diagram of the principle components of a measurement station's transmitter and receiver.

A microtag base station measures the time-of-flight and/or the angle-of-arrival of the signal reflected by the SAW transponder. A simple block diagram depicting the functional layout of base-station electronics is shown in FIG. 4. As indicated at 400, multiple receiver front-ends may be used to implement a phased array. By measuring the arrival phase from multiple antennas, the angle to the tag can be measured using well known angle-of-arrival measurement techniques. The principle components of each receiver front-end are seen at 401. The incoming signal from the target transponder is captured at the antenna 406 and is amplified by a low-noise amplifier 405. The signal is then filtered by a narrow band filter 404 to select the RF band in which the incoming signal is transmitted. A microprocessor 408 used for signal processing adjusts the gain at which the incoming signal is amplified to a level suitable for presentation to a one-bit digitizer 402 as indicated at 403. The digitized waveform is then shifted at high-speed into a register 407 for processing by the microprocessor 408. The pattern shifted into the register is compared to a stored bit pattern which characterizes and identifies a particular microtag, and the arrival time at which the matching pattern is detected is compared with the stored time at which the interrogation signal was transmitted to determine time-of-flight.

The transmitter section of the transceiver shown in FIG. 1 is seen at 413. The transmitter broadcasts an interrogation signal which has a characteristic signal pattern that activates a particular tag. The transmitter front-end 413 takes a phase shifted pattern from the microprocessor 408 which will activate a particular tag and stores the bit pattern in the shift register 409. The pattern is then shifted out to a one-bit digital to analog converter 410 whose output is amplified at 411 and transmitted out of the antenna 412.

Figure 5:
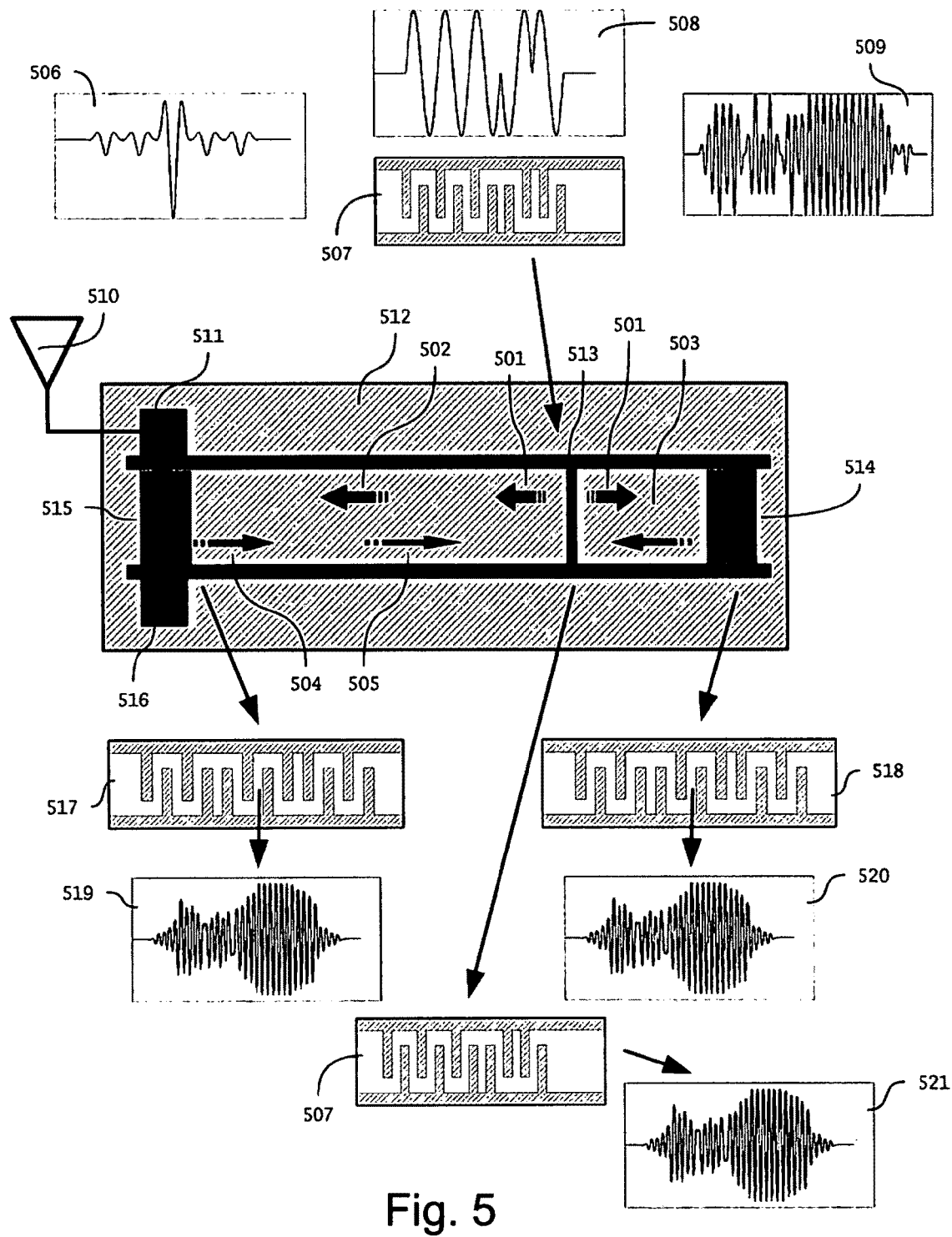
FIG. 5 illustrates the signal processing that takes place using a microtag during interrogation by the base station.

FIG. 5 illustrates the manner in which signals are processed by a preferred embodiment of invention using a SAW tag which receives an interrogation signal, illustrated at 508, transmitted from a base station. The incoming signal captured by the antenna 510 is coupled into a SAW correlator seen at 513 and shown in the exploded view of 507. As seen at 507, the SAW correlator consists of interleaved conductive fingers patterned such that a transmitted signal is having a predetermined signal pattern is coupled into the SAW device more efficiently than would be a signal having an uncorrelated pattern.

The waveform 508 transmitted by the base station will also couple into the IDTs seen at 515 and 514. The resulting surface wave signals that propagate across the substrate surface at 501 may have a wave shape like that shown at 506, and have a wave shape illustrated at 509 at locations 503 and 504. Thus the energy from the received RF signal is coupled into the surface of the saw devices. Only a device with the correct finger pattern will couple in enough energy to generate a significant return response. This manner in which the microtag selectively responds to signals having a particular waves shape is based on the same principles that are used in SAW correlator devices implemented in communications systems as described by C. K. Campbell in "Surface Acoustic Wave Devices for Mobile and Wireless Communications." San Diego: Academic Press, (1998) and by H. Matthews in "Surface Wave Filters: Design, Construction, and Use." New York: John Wiley & Sons (1977).

Figure 6:
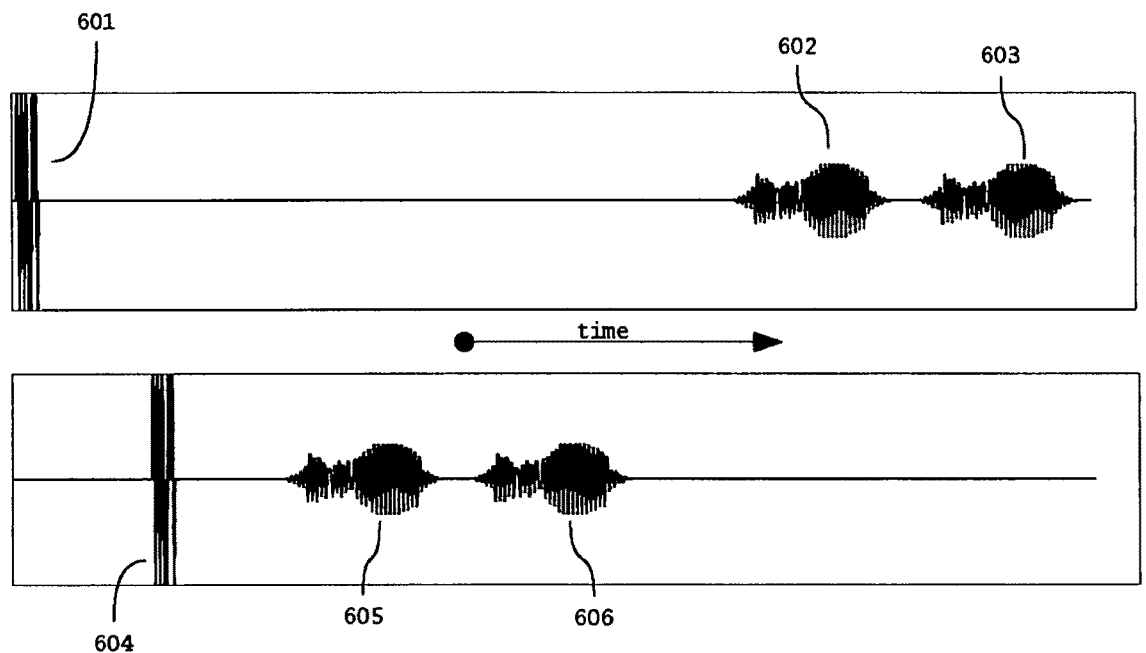
FIG. 6 shows the waveforms and relative timing of the RF signals exchanged between the tag and base station.

The surface wave signal then travels in both directions from all three IDTs. Because the surface wave travels slower than the speed of RF propagation, there is a built in time delay before the response is transmitted. Because the distance is greater between IDTs 515 and 513 than between 514 and 513, two response waveforms are transmitted at separate times. This time delay in the response is illustrated in FIG. 6. The top waveform is the RF signal transmitted from the base station and the bottom waveform is the RF signal received at the SAW transponder. The initial wave shape seen at 601 is the transmitted radar chirp from the measurement station. The wave shape seen at 604 is the transmitted chirp received at the transponder and coupling into the antenna of the SAW tag. This signal is processed by the tag and retransmitted as 605 and 606. After a brief delay, these two wave shapes are received by the measurement station as seen at 602 and 603. The waveforms 605 and 602 are generated by the IDT seen at 514 which is closer to the saw correlator IDT 513 into which the incoming chirp is coupled. The waveforms 606 and 603 are generated by the IDT 515 which is farther from the input correlator IDT 513.

The surface waves can be configured so they will couple into the outside IDTs 515 and 514 with different finger patterns. The result is a different waveform with different informational content such as illustrated at 519 and 520. In other words, the waveforms of 519 and 520 can be designed to be different. Note that the waveforms and finger patterns coming from IDT 515 and 514, and their corresponding exploded views of 517 and 518, do not need to be identical on an individual device. The wave shape seen at 521 is transmitted out of the IDT 513 from the surface wave coupled into the device from the IDTs 514 and 515.

The finger patterns for the different IDTs may be produced by generating pseudo-random codes which determine the interrogation chirp and corresponding IDT patterns. These automatically generated designs are then applied to a computer model of the SAW tag. The simulated output signal is then evaluated for peak power efficiency, reduced side-lobes, and differentiability from other tag patterns. A similar computer model is used to determine the correct one-bit waveform the measurement station should search for, as described below.

Figure 7:
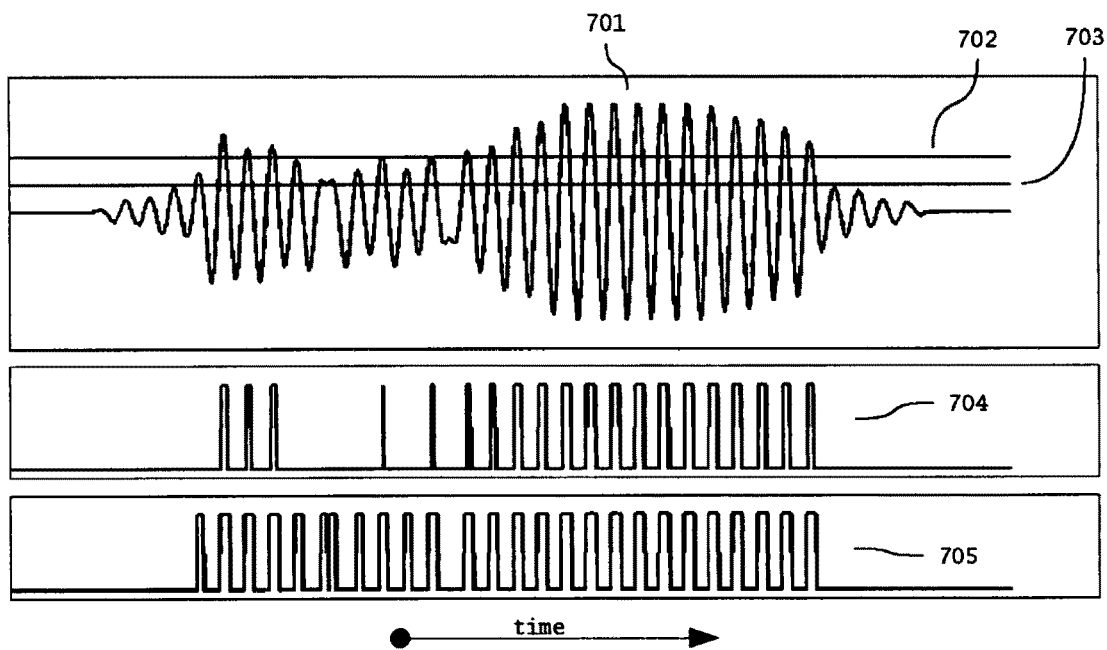
FIG. 7 illustrates the manner in which the measurement station digitizes the signal received from the tag and extracts the returned radar signature from the tag.
Figure 8:
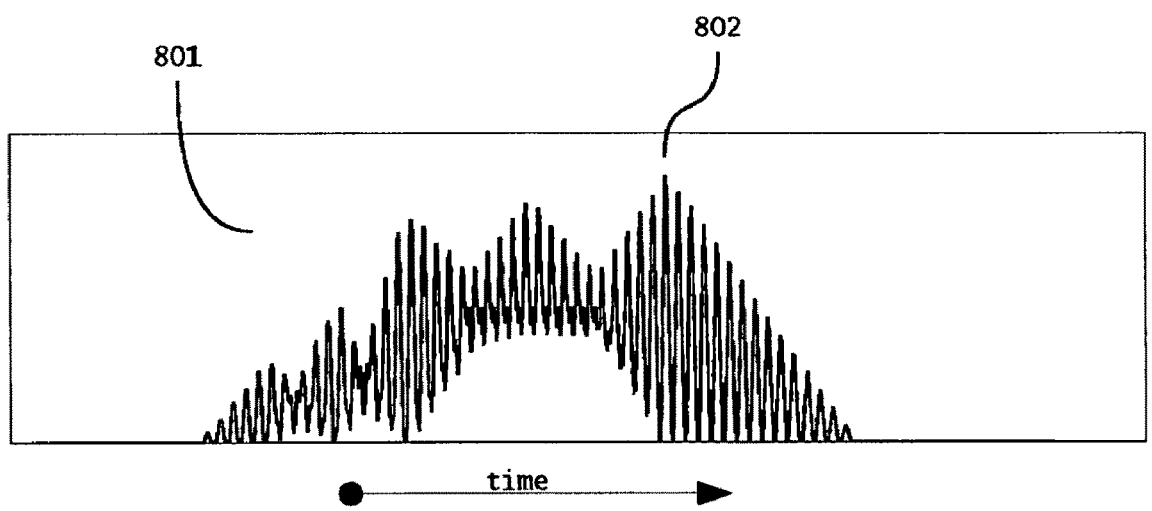
FIG. 8 illustrates the wave shape of a processed return signal.

The one-bit digitizer seen at 402 in FIG. 4 takes the received waveform at the base station, sets a threshold, and shifts in one-bit data to the high-speed shift register 407. FIG. 7 illustrates the process. The input waveform from the receiver 701 is thresholded at a particular level set by the microprocessor. The threshold level is adjustable. For example the result of two different thresholds 702 and 703 would produce the shifted bit results of 704 and 705 respectively. The microprocessor sets the threshold by detecting the peak amplitude of the input signal, and then estimating the proper threshold based on the expected return signal and this peak amplitude. Based on the return signal as digitized, the microprocessor can fit this signal to the expected signal by many different pattern matching methods. For example, the digitized signal could be convolved with the expected signal to produce a wave shape as illustrated in FIG. 8. If the peak of the convolved signal 802 is above a certain threshold, then the tag is detected, and time of flight is calculated from this peak point. There would of course be two peak points from 602 and 603, which are used to take out common mode variations from the signal due to temperature effects on the piezoelectric substrate, as well as other factors, as explained above.

As mentioned above, there are many alternative SAW transponder designs. The method and embodiment described here is another novel SAW tag implementation. By using an input IDT 103 that correlates to a particular phase shift encoded input signal, as described in H. Matthews, "Surface Wave Filters: Design, Construction, and Use." New York: John Wiley & Sons, 1977. the IDT 103 on the tag will only be sufficiently activated by the measurement station when the proper phase shift code is transmitted. Note that, although passive transponders offer the significant advantage that they do not require a power source, in some applications it may be desirable to include active components, such as one or more active amplifiers connected to amplify the signal received or transmitted by the transponder.

Figure 3:
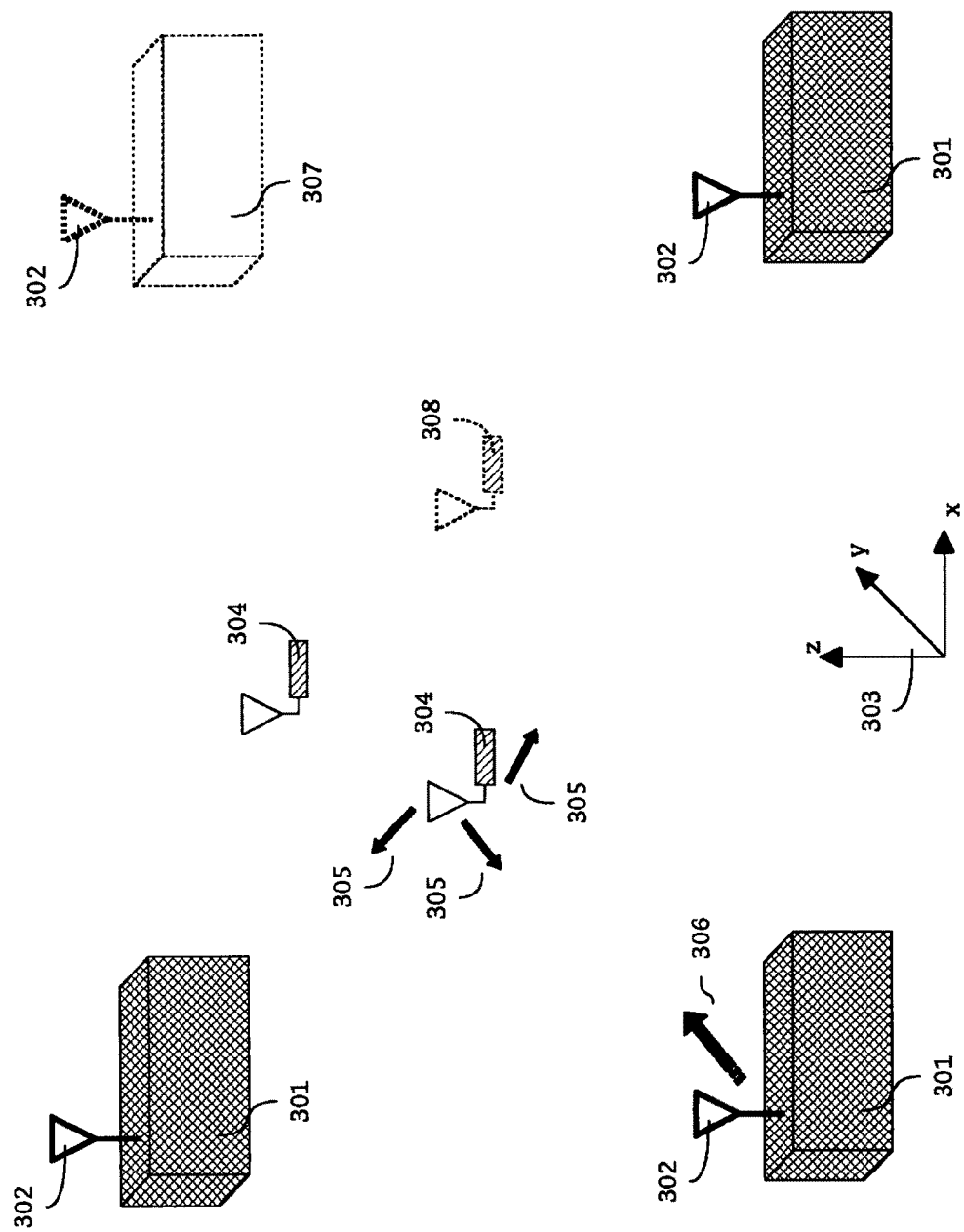
FIG. 3 illustrates the manner and conceptual components in which three measurement stations may be used to track a single SAW transponder.

Time-of-flight and angle-of-arrival measurements are used to determine the transponder's range and angle-of-arrival from a single measurement station as illustrated in FIG. 3. Simple triangulation calculations are performed on the data from three or more measurement stations to localize a tag. Each measurement station 301 will have at least one antenna 302 (more antennas are used for angle-of-arrival measurements). As illustrated at 307, more than three measurement stations may be used for localization. The tags 304 receive a transmitted RF chirp 306 from a measurement station. The chirp couples into a single tag having the corresponding correlation code. The chirp is then retransmitted in all directions from the activated tag 305. There may be many tags 308, on the order of thousands, in the system.

For a simplified system, the location of the measurement-stations are known, and only one measurement, either time-of-flight or angle-of-arrival, from at least three of the measurement stations is needed to determine the position of a microtag (or an object to which a microtag is attached). However using both time-of-flight and: angle-of-arrival measurements will improve the accuracy of the position measurement.

Measuring the time-of-flight or angle-of-arrival to the precision needed by this application is very challenging. Temperature variations of the piezoelectric substrate change the electro-acoustic properties of the device, and thus the return signature's location in temporal space, as well as causing spreading of the return signal. A dual reflector configuration may be used to measure temperature variations. Because the time difference between the two return signals will be proportional only to temperature differences as their location is fixed, the two return signals can be used to measure the device's temperature and thereby account for temperature variations when measuring time-of-flight. The effects of temperature may also be measured by the change in the return signal's waveform, referred to here as spreading. The sample waveform may be convolved with the expected signal, both for detection, peak detection, and changes due to temperature.

To measure time-of-flight, a very accurate time-to-digital converter (TDC) is preferred. TDCs have been used in physics research and radar applications for over three decades. Accuracies of 30 ps are tractable, and would lead to a range resolution of c*30 ps/2=4.5 mm. In practice, the accuracy of the time measurement depends on the signal to noise ratio of the end-to-end system. For a range resolution of 10 cm, a SNR on the order of 60 dB is necessary and tractable.

Angle-of-arrival will preferably be measured by using an array of antennas, each connected to one of the front end receivers as seen at 400 in FIG. 4, and measuring the phase shift of the return signal between the received signals. This approach is widely used, but angle-of-arrival is thought to be the more difficult to accurately measure than time-of-flight; hence, the preferred position detection scheme employs multiple, spaced apart receivers each of which measures time-of-flight, with the position estimate being formed by triangulating the several range measurements.

For a target range of 100 m, the round trip time for a pulse is 2×100 m×1/c=670 ns, where c is the speed of light. With four measurement stations, and a duty cycle of 50% to avoid overlap, the total time for one sample is 2×4×670 ns=5.360 microseconds, yielding an upper limit for the update rate of 186 kHz. This suggests that impressive 3-d tracking rates may be achieved in comparison to the tracking rates achieved by other technologies. Resolution improvements could be attained by integrating the result over time. To instrument the motion of a human, approximately 13 microtags would be necessary, each of which must be separately tracked, thus, update rates of up to around 14 kHz would be tractable.

In order for the microtag system to be useful in many applications, numerous transponders will need to coexist within range of a few measurement stations. To keep the return signals of multiple tags from interfering with each other, a tag selection method will be employed. SAW correlators, extensively used in SAW filter applications, will be implemented. Saw correlators are described in the above noted papers by Brocato and Reindl, and by C. K. Campbell in "Surface Acoustic Wave Devices for Mobile and Wireless Communications," Academic Press, San Diego (1998). By using unique correlators, the measurement station can send out a transmit pulse that will only be returned by a single transponder. Note that identification encoding is also imparted to the response signal by the delay times exhibited by signal components. These delays allow multipath signals to die down before the microtag responds, but small increments to the bulk delay may be added so that different groups of tags will start responding at different times. Existing methods for encoding data for transmission from the SAW transponders may be employed.

It should be noted that, although passive transponders offer the significant advantage that they do not require power source, in some application it may be desirable to include active components, such as one or more active amplifiers connected to amplify the signal received or transmitted by the transponder.

Active SAW Transducer with Power-Conserving Amplification

Figure 9:
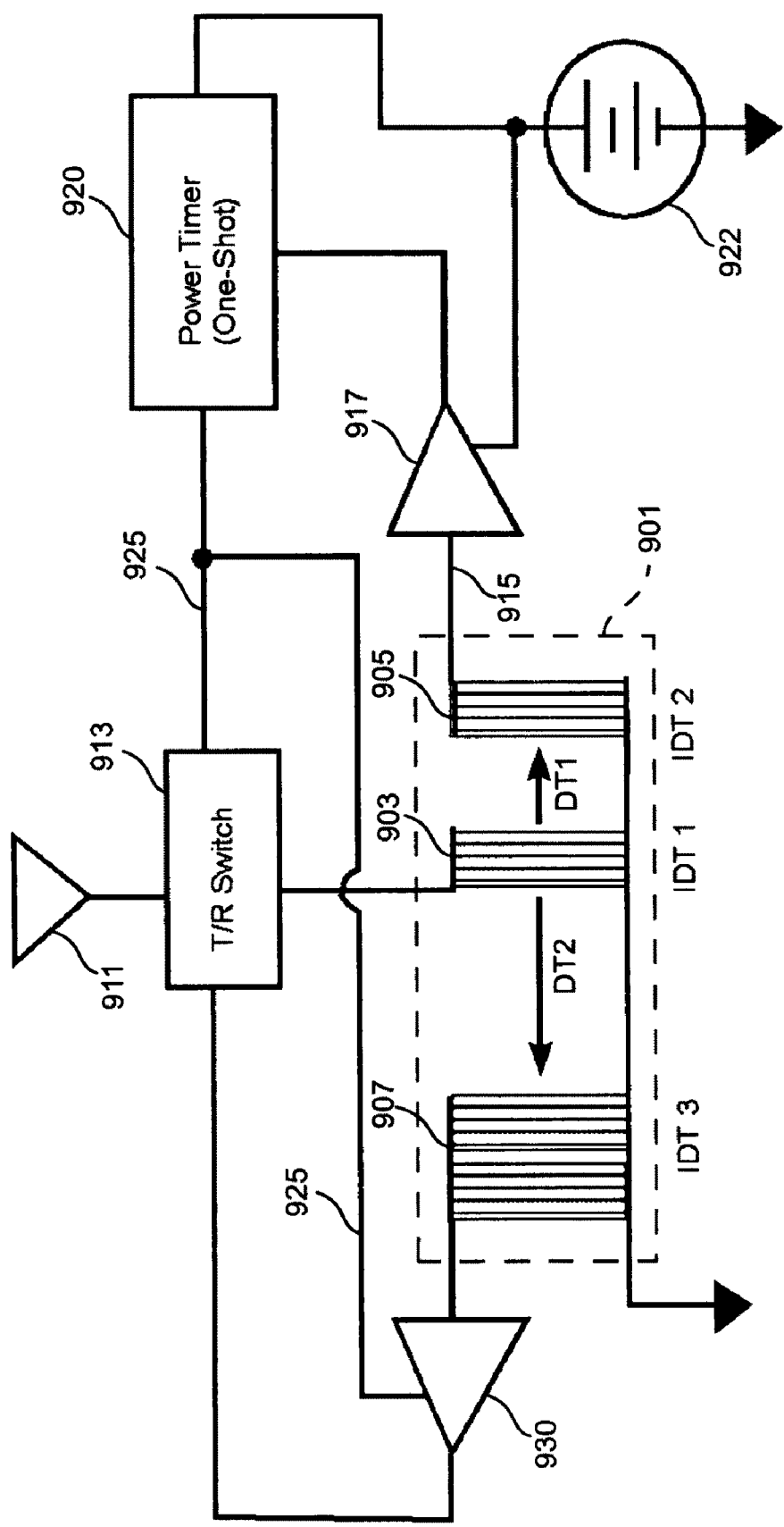
FIG. 9 is a block diagram illustrating an active SAW transducer embodying the invention that incorporates an amplifier that operates momentarily to boost the strength of the transmitted response signal.

FIG. 9 shows a surface acoustic wave transducer which responds to a preamble wave shape in the transmitted electromagnetic interrogation signal to activate a normally dormant battery-powered amplifier connected to the output of the transducer to amplify the response signal transmitted from the microtag.

As seen in FIG. 9, the surface wave acoustic transducer is built on a piezoelectric substrate 901 patterned with a conductive input IDT1 seen at 903 positioned between IDT2 seen on the right at 905 and an IDT3 seen on the left at 907. An incoming interrogation signal received on the antenna 911 is applied to the IDT1 at 903 via a transmit/receive switch 913 and launches a surface acoustic wave that propagates in both directions from the IDT1 at 903 to the IDT2 at 905 and to the IDT3 at 907.

The surface wave arrives first at the IDT2 at 905 which has a pattern that correlates to a preamble acoustic wave shape produced by the leading portion of the interrogation signal received on antenna 911. As the preamble wave passes the IDT2, IDT2 produces a well-formed pulse that energizes a control input 915 of a low-power discriminator 917 The discriminator 917 picks off this pulse and triggers a one-shot multivibrator 920 which provides a timed, short interval of power to the conductor 925, long enough to last through the entire transit of all relevant acoustic signals through IDT3 at 907; that is, the sum of the delay time DT1 and the transit time through IDT3, plus sufficient time for reflections from the other reflectors (not shown) and/or reflections from IDT2 to arrive as well.

The one-shot multivibrator 920 applies power from a small battery 922 via the output conductor 925 to powers up a simple RF amplifier 930 that boosts the signal appearing at IDT3 before it is applied through the transmit/receive switch 913 to the antenna 913. The delays DT1 and DT2 are designed such that the RF amplifier 930 will become fully operational and stabilize by the time the surface acoustic wave first reaches IDT3 at 907 which converts that surface wave into an electrical signal applied to the input of amplifier 930, which boosts the amplitude of the response signal for retransmission.

In the active transponder shown in FIG. 9, the RF amplifier 930 is unpowered until a wave shape that correlates with the pattern in IDT2 triggers the discriminator 917, thereby preventing power from being switched ON when signals other that the correct interrogation signal arrives. Thus, the preamble code in the interrogation signal can inform one or more microtags that an interrogation signal is coming, causing them to power up to transmit a response signal to the remote measuring station(s).

In arrangements of the type seen in FIG. 9 in which the transmitter and receiver share an antenna, the transmit/receive switch 913 normally connects the antenna 911 to the input IDT1 at 903, and connects the antenna 911 to the RF amplifier 930 output when the amplifier 930 is powered up. The T/R switch 913 may be implemented using fast FETs, properly biased PIN diodes, bipolar transistors, or RF MEMS switches. To conserve battery power, the power timer, the discriminator and the T/R switch circuits should be designed to consume extremely low quiescent power.

In alternative arrangements in which the transmitter and receiver have different antennas, it will still be necessary to disable the receive operation when the RF transmitter amplifier is powered up to avoid reinjecting the transmitted signal into the SAW device. A simple RF switch, saturated FET, or a transistor can be connected to disable the connection to the input IDT during powered transmission.

Commercial Applications

Tracking packages in a warehouse has always provided major challenges. The microtag system employing the present invention offers a solution for inventory control and tracking in a store or warehouse. Locating and inventorying objects in a store would be possible without manually going through and cataloging every item. By using microtags, the measurement-station would automatically find and inventory an entire store or warehouse. The microtag invention can also track the movement of objects, allowing users to locate lost objects and prevent theft, and even recover stolen items. A microtag could be attached to hazardous waste or dangerous items, thus tracking the movement and ensuring safe storage, transport, and disposal. As items come into a dump, the contents could be scanned for hazardous waste or dangerous items, which can be simultaneously located by the system.

The microtag system can be used to advantage in a variety asset tracking systems that prevent things from being lost. Microtags can also be used to provide location dependent interaction. For example, microtags can be used as beacons to identify locations, such as positions in a museum where an automated audio playback systems plays recorded descriptions of particular exhibits to passersby.

Mobile platforms such as automobiles, small unmanned aerial vehicles, and robots would benefit by the use of microtags. Operational measurement-stations could be made at low cost and mobile, particularly when high performance is not required. A moderate performance system could be effective in collision avoidance and to coordinate multiple vehicles. Only a few vehicles would need to be instrumented with a measurement station, and the measurement-station equipped vehicles would then share position information by telemetry with other vehicles that are merely tagged, thus reducing the overall system cost.

One of the most useful applications of this invention is tracking the location of people. Tracking the location of prisoners with microtags embedded in wristbands and the like would allow guards to ensure prisoners were in the authorized locations. The wristband would have an electrical conductor, which if tampered with would cause the signature of the wristband to alert prison guards of the tampering.

The location of persons working in hazardous situations could be tracked by microtags, thus increasing safety and emergency response. For example, soldiers wearing microtags could have their position located if they became disconnected from their unit. The signature of a microtag also lends to a built-in level of security. Without knowledge of the tag's signature, it would be difficult for an unauthorized person to generate an interrogation signal to which a tag would respond.

Field programmable microtags may be connecting or disconnecting exposed external contact points on the microtag, thereby selecting or altering the specific encoding signature which is emitted by (or responded to*) by the microtag. Microtags may be equipped with buttons or the like that allow information to be transmitted by the person manipulating the button to the reading station.

Keeping track of compromised people in large places is a problem encountered in hospital or triage settings. Patients with microtags could be easily tracked from a distance ensuring they are given quick and proper care in chaotic situations. Using the same method as described to keep prisoners from tampering with their wristbands, a microtag would be configured with a button allowing for the return signature to change when activated. This would give a patient the ability to alert a care provider through a wireless method that requires no batteries.

Another example of a dynamic application which illustrates the utility of this invention is the encoding of human body motion. Traditionally body motion has been recorded with vision instrumented rooms, inertial measurement units (IMU), or ultrasonic sensors. Ultrasonic transponders are bulky, require a power source, and have limited line-of-sight constraints and their performance is greatly compromised by typical environmental interference. IMUs are bulky, costly, require a power source, and are limited by bandwidth and accuracy. A vision-based tracking system requires a carefully controlled environment to ensure line-of-sight and sufficient contrast between the obtrusive visual markers and background objects. In contrast, microtags provide unobtrusive low-cost tracking at high data rates.

A person wearing chip-sized microtags sewn into the wrists, ankles, and joints of their clothing would have their body motion tracked in real-time. Such encoding could be used for a variety of human computer interfaces. Two of the many applications which this system is uniquely suited for include allowing unhindered natural motion in a virtual reality environment, training a robot through intuitive movements, or interactive computer games.

Because of their small size and low-cost, microtags are well suited for several disposable applications, such as tracking animals for research or domestic control. As an added advantage, because microtags do not requiring external power, their useful life is virtually unlimited and maintenance free. Livestock could be tracked for numerous reasons including monitoring, moving, and collecting. Pets could be track and recovered more easily when lost.

Because of many advantages, such as low-cost, zero-power, small size, and localization abilities, the usefulness of a microtag system as contemplated by the invention is broad and poorly met by any existing solutions.

CONCLUSION

It is to be understood that the methods and apparatus which have been described above are merely illustrative applications of the principles of the invention. Numerous modifications may be made by those skilled in the art without departing from the true spirit and scope of this invention.

What is claimed is:

1. A system for detecting tile location of an object ill three-dimensional space comprising, in combination,
one or more transmitting stations for periodically transmitting electromagnetic signals,
a surface wave acoustic transducer attached to said object, said transducer comprising:
an antenna for capturing electrical energy from said electromagnetic signals received from said one or more transmitting stations,
a piezoelectric substrate,
a first set of conductive elements attached to the surface of said piezoelectric substrate and coupled to said antenna for converting said electrical energy into a surface acoustic wave that propagates across the surface of said substrate,
a second set said conductive elements attached to the surface of said piezoelectric substrate and positioned in a path of travel of said acoustic surface wave for reconverting said acoustic wave into a modified electrical signal having a modified wave shape that uniquely identifies said transducer, for transmission back to said one or more transmitting stations as an electromagnetic signal,
a third set of conductive elements attached to the surface of said piezoelectric substrate and positioned in a path of travel of said acoustic surface wave for converting said acoustic wave into a control signal that occurs before said modified electrical signal is produced by said second set of conductive elements,
a normally unpowered amplification circuit having a signal input connected to said second set of conductive elements for amplifying said modified electrical signal as transmitted from said transducer to one or more receiving stations, and
a switching circuit responsive to said control signal for supplying electrical power to said amplification circuit before and during occurrence of said modified electrical signal, and
a signal processing system for determining the position of said transducer in three-dimensional space by measuring the distance separating said transducer from one or more receiving stations or by measuring the angle-of-arrival of said modified electromagnetic signal as it is received at one or more receiving stations, and calculating said position based on said distance or said angle-of-arrival or both.

2. The system for detecting the location of an object in three-dimensional space as set forth in claim 1 wherein at least some of said electromagnetic signals transmitted from said one or more transmitting stations possess a predetermined wave shape and wherein at least one of said sets of conductive elements includes elements that are selectively responsive to said signals having said predetermined wave shape.

3. The system for detecting the location of an object in three-dimensional space as set forth in claim 1 wherein said signal processing system measures the distance separating said transducer from said one or more receiving stations by measuring the time-of-flight of said electromagnetic signal between said surface wave acoustic transducer and each of said one or more receiving stations.

4. The system for detecting the location of an object in three-dimensional space as set forth in claim 1 wherein said signal processing system measures the angle-of-arrival of said modified electromagnetic signal by measuring the phase difference between said modified electromagnetic signal as received by two or more spaced-apart receiving antennae.

5. A system for tracking file position of each of a plurality of different objects in three dimensional space comprising, in combination,
at least one transmitter for transmitting a sequence of electromagnetic interrogation signals each of which has a predetermined wave shape,
a transducer attached to each of said objects comprising:
a piezoelectric substrate,
a receiving antenna for receiving said electromagnetic signals,
a first set of conductive elements connected to said receiving antenna for converting one at least one of said interrogation signals into a surface acoustic wave,
a second set of conductive elements positioned in a path of travel of said surface acoustic wave at a first distance from said first set of conductive elements to produce a response signal having detectable properties that identify said transducer, for transmission back to said one or more transmitting stations as an electromagnetic signal,
a third set of conductive elements positioned in a path of travel of said surface being shorter than said first distance, such that said third set of conductive elements produces a control signal that occurs prior to the production of said response signal,
a transmitting antenna,
an amplifier having a signal input coupled to said second set of conductive elements and a signal output connected to said transmitting antenna for amplifying said response signal transmitted from said transmitting antenna as said electromagnetic response signal from said transducer,
a switching circuit connected to said third set of conductive elements and responsive to said control signal for supplying an operating potential to said amplifier during the time when said response signal is produced by said second set of conductive elements, and
at least one signal processor located remotely from said transducer for receiving said electromagnetic response signal to identify said transducer and estimate its position in three-dimensional space.

6. The system for tracking the position of each of a plurality of different objects as set forth in claim 5 wherein at least one of said sets of conductive elements includes elements that are selectively responsive to the waveshape of one or more of said interrogation signals.

7. The system for tracking the position of each of a plurality of different objects as set forth in claim 5 wherein said signal processor measures the distance separating said transducer from said signal processor by measuring the time-of-flight of said response signal between said surface acoustic wave transducer and said signal processor.

8. The system for tracking the position of each of a plurality of different objects as set forth in claim 5 wherein said signal processor measures the angle-of-arrival of said electromagnetic response signal by measuring the phase difference between said response signal as received by two or more spaced-apart receiving antennae.

9. A surface acoustic wave transducer comprising, in combination:
a receiving antenna for capturing electrical energy from an electromagnetic interrogation signal received from a remotely located transmitting station,
a piezoelectric substrate,
a first set of conductive elements coupled to said receiving antenna, said first pattern of conductive elements being positioned adjacent to the surface of said piezoelectric substrate at a first location for converting said electrical energy into surface acoustic waves that propagate across the surface of said piezoelectric substrate,
a second set of conductive elements positioned adjacent to the surface of said piezoelectric substrate at a second location spaced from said first location by a first distance for converting surface acoustic waves received at said second location into a control signal,
a third set of conductive elements positioned adjacent to the surface of said piezoelectric substrate at a third location spaced from said first location by a second distance that is greater than said first distance for converting surface acoustic waves received at said third location into a response signal,
an amplification circuit having a signal input coupled to said third set of conductive elements for receiving said response signal, a control input responsive to said control signal for activating said amplification circuit, and a signal output for producing an amplified response signal when said amplification circuit is activated, and
a transmitting antenna connected to said signal output for converting said amplified response signal into an electromagnetic response signal that is transmitted to one or more remotely located receiving stations.

10. The surface acoustic wave transducer set forth in claim 9 further including a switching circuit responsive to said control signal for decoupling said receiving antenna from said first set of conductive elements.

11. The surface acoustic wave transducer set forth in claim 9 wherein said receiving antenna and said transmitting antenna are the same antenna.

12. The surface acoustic wave transducer set forth in claim 11 further including a switching circuit responsive to said control signal for decoupling said receiving antenna from said first set of conductive elements and instead coupling said receiving antenna to said second output so that said receiving antenna transmits said electromagnetic response signal to said one or more remotely located receiving stations.

13. The surface acoustic wave transducer set forth in claim 12 further including a source of electrical power and a first switching circuit coupled to said control input for connecting said source of electrical power to said amplification circuit to activate said amplification circuit in response to said control input.

14. The surface acoustic wave transducer as set forth in claim 9 further including a source of electrical power and a first switching circuit coupled to said control input for connecting said source of electrical power to said amplification circuit to activate said amplification circuit in response to said control input.

15. The surface acoustic wave transducer set forth in claim 9 wherein said first set of conductive elements is positioned between said second set of conductive elements and said third set of conductive elements and wherein said surface acoustic waves propagate across the surface of said piezoelectric substrate in one direction to said second set of conductive elements and in the opposite direction to said third set of conductive elements.

16. The surface acoustic wave transducer set forth in claim 9 wherein said electromagnetic response signal has a wave shape that uniquely identifies said surface acoustic wave transducer.

17. The surface acoustic wave transducer set forth in claim 9 wherein said one or more remotely located receiving stations are coupled to a signal processing system for determining the position of said surface acoustic wave transducer in three-dimensional space by measuring the distance separating said transducer from said one or more receiving stations or by measuring the angle-of-arrival of said electromagnetic response signal as it is received at one or more receiving stations, and by calculating said position based on said distance or said angle-of-arrival or both.

* * * * *